(12) United States Patent
Lee et al.

(10) Patent No.: US 10,598,333 B1
(45) Date of Patent: Mar. 24, 2020

(54) COMBINATIVE LIGHT STRIP ASSEMBLY FOR VEHICLE

(71) Applicant: TAN DE TECH CO., LTD., Yunlin County (TW)

(72) Inventors: Chao Pai Lee, Yunlin County (TW); Chung Chiang Pan, Yunlin County (TW); Cheng Chih Lai, Yunlin County (TW)

(73) Assignee: TAN DE TECH CO., LTD., Douliu (TW)

( * ) Notice: Subject to any disclaimer, the term of this patent is extended or adjusted under 35 U.S.C. 154(b) by 0 days.

(21) Appl. No.: 16/161,933

(22) Filed: Oct. 16, 2018

(51) Int. Cl.
| | |
|---|---|
| *F21S 43/15* | (2018.01) |
| *F21S 43/241* | (2018.01) |
| *F21S 43/30* | (2018.01) |
| *F21S 43/249* | (2018.01) |
| *F21S 43/14* | (2018.01) |
| *F21V 7/04* | (2006.01) |
| *F21Y 113/13* | (2016.01) |
| *F21Y 115/10* | (2016.01) |

(52) U.S. Cl.
CPC .............. *F21S 43/15* (2018.01); *F21S 43/14* (2018.01); *F21S 43/241* (2018.01); *F21S 43/249* (2018.01); *F21S 43/30* (2018.01); *F21Y 2113/13* (2016.08); *F21Y 2115/10* (2016.08)

(58) Field of Classification Search
CPC . F21Y 2103/10; F21Y 2103/00; G02B 6/001; G02B 6/0038; G02B 6/0068; G02B 6/0006; G02B 6/0078; F21S 43/245; F21S 43/237; F21S 4/28; H01L 2924/00; B60Q 3/78; B60Q 1/0011; B60Q 1/2607; B60Q 1/323; B29C 48/00
See application file for complete search history.

(56) References Cited

U.S. PATENT DOCUMENTS

| | | | | |
|---|---|---|---|---|
| 2010/0091515 A1* | 4/2010 | Goto | ..................... | G02B 6/0006 362/551 |
| 2016/0146424 A1* | 5/2016 | Chiu | ....................... | F21V 5/002 362/311.03 |
| 2016/0193954 A1* | 7/2016 | Nakada | ................... | F21S 43/14 362/511 |

FOREIGN PATENT DOCUMENTS

| | | |
|---|---|---|
| TW | I313232 | 8/2009 |
| TW | M399260 | 3/2011 |

* cited by examiner

*Primary Examiner* — William J Carter
*Assistant Examiner* — Omar Rojas Cadima
(74) *Attorney, Agent, or Firm* — Muncy, Geissler, Olds & Lowe, PC (57) ABSTRACT

A light strip assembly includes a plurality of light strips in series connection. Each of the light strips includes a straight strip member, a light guiding member, and a light emitting device. The strip member has a mounting surface and an exit surface, and the light guiding member is connected to the mounting surface of the strip member and has an entrance surface and a reflector. The light emitting devices emit lights to the light guiding members via the entrance surfaces, and the lights are reflected by the reflectors to emit to the strip members, and then the lights leave the strip members via the exit surfaces.

10 Claims, 8 Drawing Sheets

COMBINATIVE LIGHT STRIP ASSEMBLY FOR VEHICLE

BACKGROUND OF THE INVENTION

1. Technical Field

The present invention relates to an accessory of a vehicle, and more particularly to a combinative light strip assembly for a vehicle.

2. Description of Related Art

Typically, various vehicles are presented in present days for different purposes of transportation. Even for a person, he/she may have plural types of vehicles in ordinary life.

Every vehicle is equipped with various lights for different purposes, such as headlights, direction lights, brake lights, and so on. Theses lights may indicate the moving status of the vehicle, such as turning (left or right), stopping, or braking, to warn people or other vehicles, or illuminate in a dark driving environment. The conventional lights are losing their illuminating or warning functions since there are a lot of vehicles on the roads and providing the same lights.

Taiwan invention patent 1313232 disclosed a light strip for vehicle, which includes a strip base and a plurality of light emitting members. The strip base has a straight section, a curved section, and the light emitting members are provided at the straight section and the curved section of the strip base, respectively. The light emitting members on the straight section emit light directly out of the strip base, and the light emitting members on the curved section emit light to a reflector, and then the reflector reflects the light out of the strip base.

Taiwan utility model patent M399260 provided a concentrating structure of LED strips. The LED strips are received in a reflecting mask box. The reflecting mask box has an opening at a front side, and the LED strips are provided on a bottom plate. The reflecting mask box is provided with a bore for a wire entering the reflecting mask box and connected to the LED strips. A reflector is mounted on the reflecting mask box at the opening. The reflector has a first reflecting surface and a second reflecting surface to reflect the light provided by the LED strips.

These two prior arts provided the LED strips to emit light for warning function. However, the conventional LED strip is coated with a reflecting layer on a back side thereof to increase the light efficiency. But, the reflecting layer increases the cost of the LED strip and is bad for environment.

The modern vehicles, such as electric vehicles, usually need long LED strips (usually over a meter), and the LED strips usually have to be flexed at several portions. Therefore, a mold for manufacturing such LED strips is huge, and needs an injection molding machine of specific specifications.

Besides, the conventional LED strip provides two LEDs at opposite ends of a strip, and lights of the LED are guided to the entire strip. It is easy to understand that the strip is lighter at the opposite ends thereof and is darker at the middle.

BRIEF SUMMARY OF THE INVENTION

In view of the above, the primary objective of the present invention is to provide a light strip assembly, which provides plural light strips for selective connection to match the shape and length of the vehicle and to reduce the cost of mold to manufacture the light strips and the time for manufacture, and the yield rate is raised.

The secondary objective of the present invention is to provide a light strip, which has a side-light structure to have a uniform distribution of light.

The third objective of the present invention is to provide a light strip assembly, which provides an adhesive with the same reflectance and refractive index as the strip to have a uniform distribution of light.

The fourth objective of the present invention is to provide a light strip, which is provided with fins on the surface to enhance uniform distribution of light.

In order to achieve the objectives of the present invention, a light strip includes a strip member having a mounting surface and an exit surface, wherein the exit surface is adjacent to the mounting surface; a light guiding member connected to the mounting surface of the strip member, wherein the light guiding member has an entrance surface and a reflector; and a light emitting device connected to the entrance surface of the light guiding member.

The light emitting device emits light to the light guiding member via the entrance surface, and the light is reflected by the reflector to emit to the strip member, and then the light leaves the strip member via the exit surface.

The present invention further provides a light strip assembly, which includes a straight light strip and a bent light strip in series connection, in which the mounting surface of the straight strip member of the straight light strip is connected to the mounting surface of the bent strip member of the bent light strip, and the exit surface of the straight strip member of the straight light strip is connected to the exit surface of the bent strip member of the bent light strip.

In an embodiment, the light guiding member is a semi-cone block having a coned surface; the entrance surface as semi circle shape is adjacent to the coned surface, and the reflector is provided on the coned surface.

In an embodiment, the strip member is provided with a plurality of fins on the exit surface; the fins are separated and parallel to each other.

In an embodiment, a density of the fins of the bent light strip is greater than that of the fins of the straight light strip.

In an embodiment, the light guiding member is a light emitting diode (LED) emitting various color light.

In an embodiment, the straight strip member of the straight light strip is serially connected to the bent strip member of the bent light strip through an optical adhesive, and the optical adhesive has a reflectance and/or a refractive index the same as that of the straight strip member of the straight light strip and the bent strip member of the bent light strip.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
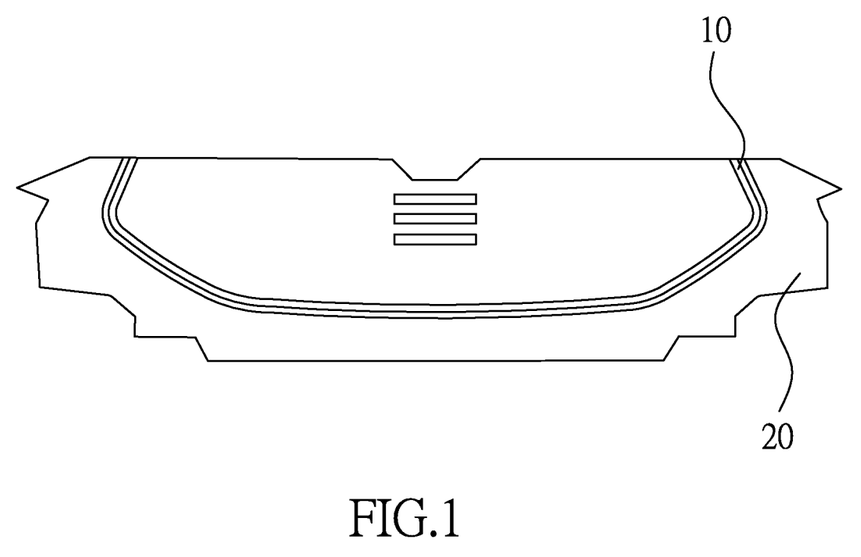
FIG. 1 is a sketch diagram of a first preferred embodiment of the present invention, showing the light strip assembly on the vehicle.

FIG. 1 shows a light strip assembly 10 of the first preferred embodiment mounted on a vehicle 20. In the present embodiment, the vehicle 20 is provided with a slot, in which the light strip assembly 10 is received and fixed. The light strip assembly 10 may be mounted at a grille, a front bumper, a rear bumper, or other suitable portions of a vehicle.

Figure 2:
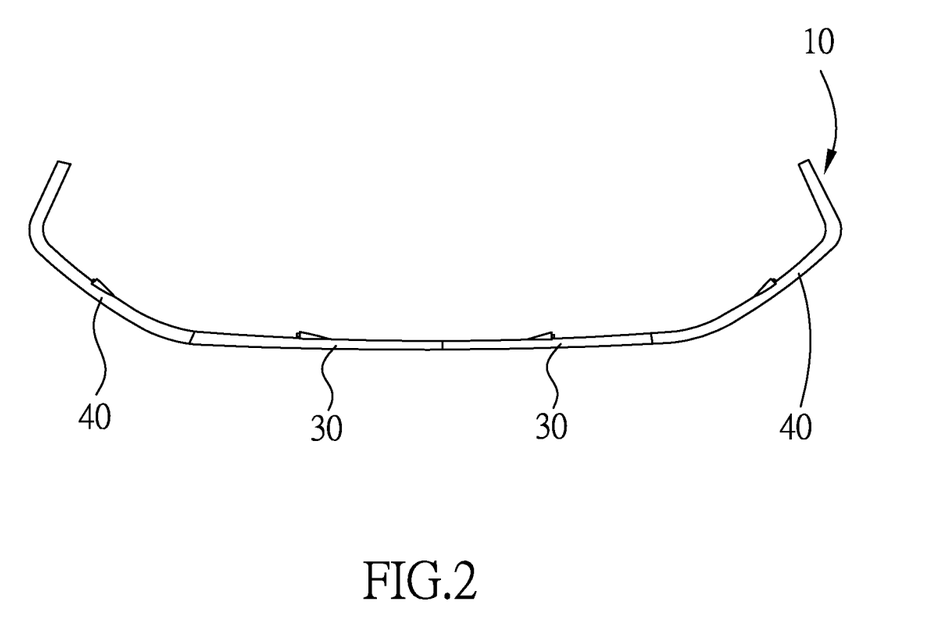
FIG. 2 is a lateral view of the first preferred embodiment of the present invention.

As shown in FIG. 2, the light strip assembly 10 includes at least a straight light strip 30 and/or at least a bent light strip 40. In the present embodiment, the light strip assembly 10 includes two of the straight light strips 30 and two of the bent light strips 40 connected in series.

Figure 3:
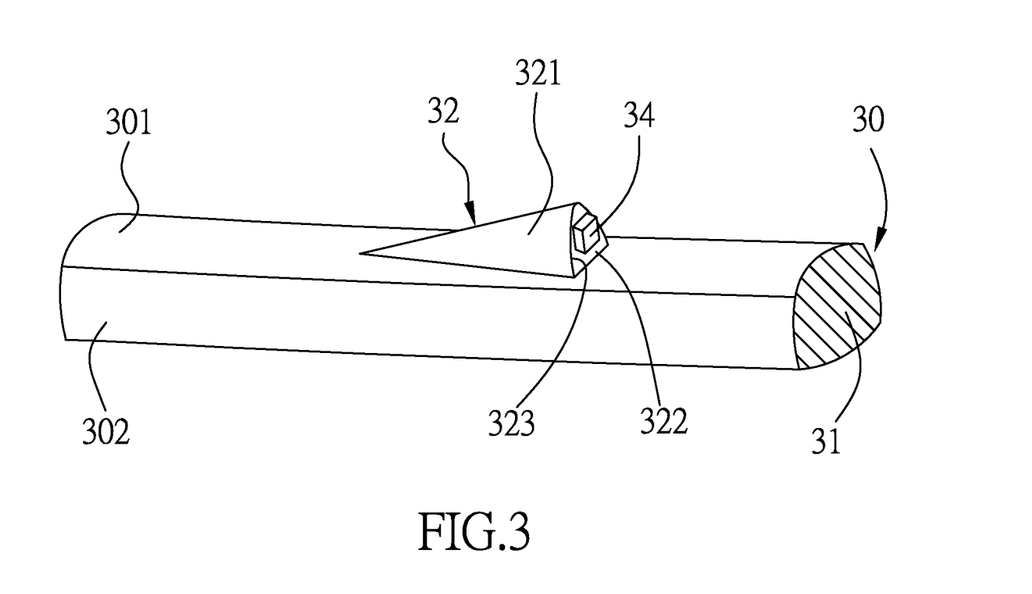
FIG. 3 is a perspective view of the straight light strip of the first preferred embodiment of the present invention.

As shown in FIG. 3, the light strip 30 includes a strip member 31, a light guiding member 32 and a light emitting device 34. The strip member 31 is straight, having a mounting surface 301 and an exit surface 302 adjacent to the mounting surface 301.

The light guiding member 32 is a semi-cone block provided on the mounting surface 301 of the strip member 31. The light guiding member 32 has a coned surface 321 and an entrance surface 322 on an end of the coned surface 321. A reflector 323 is provided on the coned surface 321. In the present embodiment, the light guiding member 32 is initially formed on the strip member 31 to form a single element.

The light emitting device 34 is connected to the entrance surface 322 of the light guiding member 32 and associated with the reflector 323. In the present embodiment, the light guiding member 32 is a light emitting diode (LED) emitting various color light, such as white light, red light, green light, and blue light.

Figure 4:
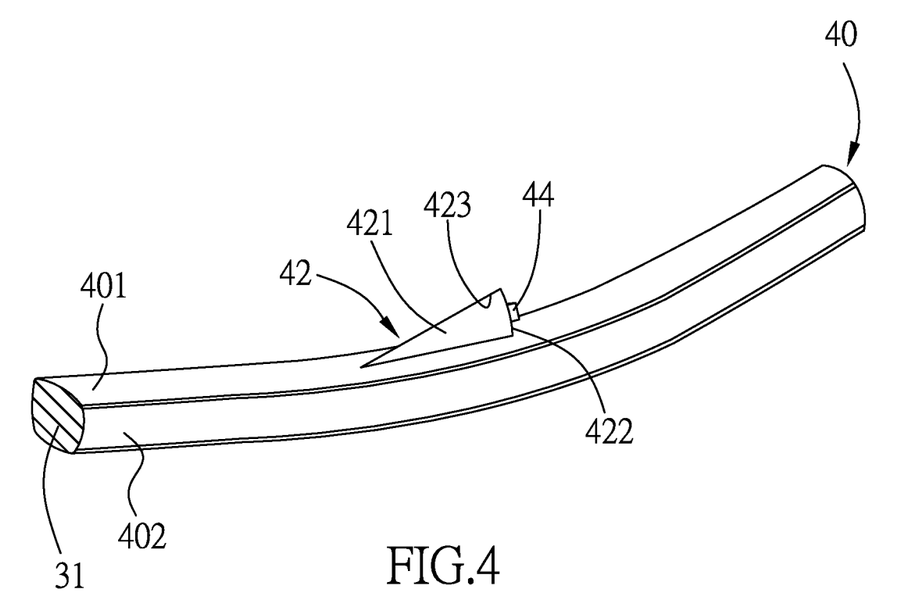
FIG. 4 is a perspective view of the bent light strip of the first preferred embodiment of the present invention.

As shown in FIG. 4, the bent light strip 40 includes a bent strip member 41, a bent light strip light guiding member 42 and a bent light strip light emitting device 44. The bent strip member 41 is bent at several portions thereof, having a bent light strip mounting surface 401 and a bent light strip exit surface 402 adjacent to the bent light strip mounting surface 401.

The bent light strip light guiding member 42 is a semi-cone block provided on the bent light strip mounting surface 401 of the bent strip member 41. The bent light strip light guiding member 42 has a coned surface 421 and a bent light strip entrance surface 422 on an end of the coned surface 421. A bent light strip reflector 423 is provided on the coned surface 421. In the present embodiment, the bent light strip light guiding member 42 is initially formed on the bent strip member 41 to form a single element.

The bent light strip light emitting device 44 is connected to the bent light strip entrance surface 422 of the bent light strip light guiding member 42 and associated with the bent light strip reflector 423. In the present embodiment, the bent light strip light guiding member 42 is a LED emitting various color lights, such as white light, red light, green light, and blue light.

Basically, the straight light strip 30 and the bent light strip 40 are the same, except that the strip member 31 of the straight light strip 30 is straight and the bent strip member 41 of the bent light strip 40 is bent. The strip members 31, 41 of the straight and the bent light strips 30, 40 are coated with reflecting layer except the exit surfaces 302, 402.

Figure 5:
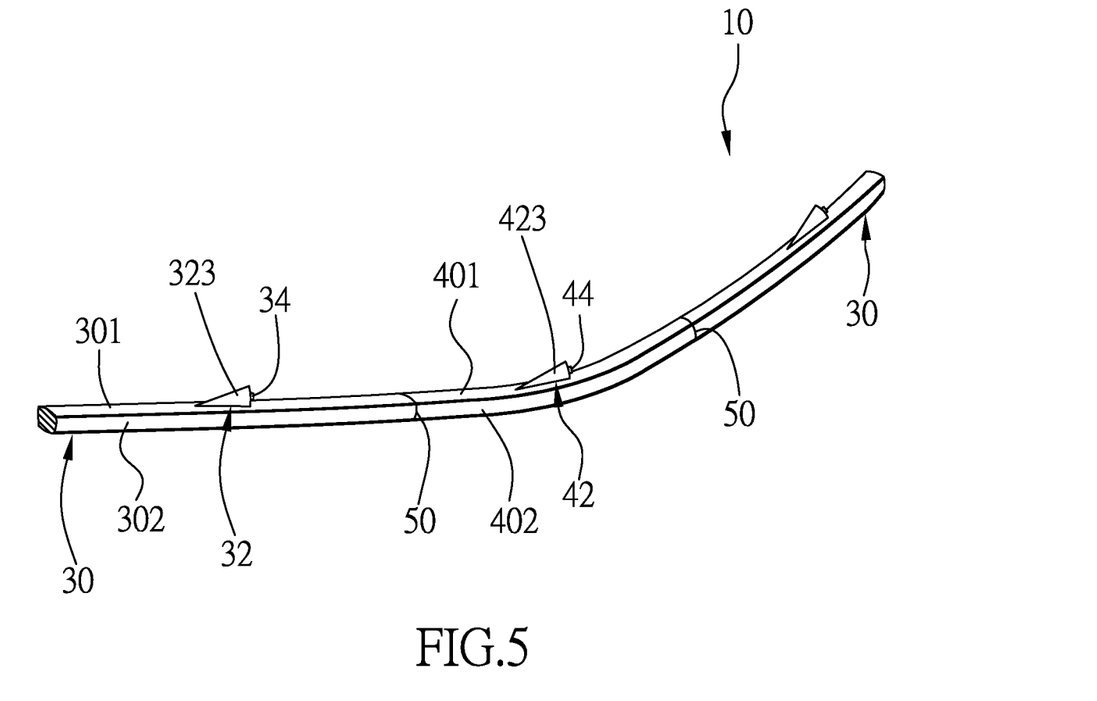
FIG. 5 is a perspective view of the first preferred embodiment of the present invention, showing the straight light strip connected to the bent light strip.

As shown in FIG. 5, in practice, an end of the strip member 31 of the straight light strip 30 is connected to an end of the bent strip member 41 of the bent light strip 40 by an optical adhesive 50. The optical adhesive 50 allows light emitting from the strip member 31 of the straight light strip 30 to the bent strip member 41 of the bent light strip 40 or from the bent strip member 41 of the bent light strip 40 to the strip member 31 of the straight light strip 30. A reflectance and/or a refractive index of the optical adhesive 50 is/are the same as that of the strip members 31, 41 of the straight and the bent light strips 30, 40.

When the strip member 31 of the straight light strip 30 is connected to the bent strip member 41 of the bent light strip 40, the exit surface 302 of the strip member 31 of the straight light strip 30 is adjacent to the bent light strip exit surface 402 of the bent strip member 41 of the bent light strip 40, and the mounting surface 301 of the strip member 31 of the straight light strip 30 is adjacent to the bent light strip mounting surface 401 of the bent strip member 41 of the bent light strip 40. In other words, the mounting surfaces 301, 401 of the straight and the bent light strips 30, 40 are located at the same side of the light strip assembly 10, and the exit surfaces 302, 402 of the straight and the bent light strips 30, 40 are located at the same side of the light strip assembly 10.

In the straight light strip 30, the light emitting device 34 emits light, and the light enters the light guiding member 32 via the entrance surface 322 and is reflected by the reflector 323 to enter the strip member 31. The light emits in the strip member 31 and leaves the strip member 31 via the exit surface 302. The light of the bent light strip emits in the same way, so I do not describe the detail here. As a result, the lights of the light emitting devices 34, 44 emit to the strip members 31, 41 through the light guiding members 32, 42, and leave the strip members 31, 41 through the exit surfaces 302, 402. Some of the lights emit to the next strip members 31 or 41 through the optical adhesives 50.

Figure 6:
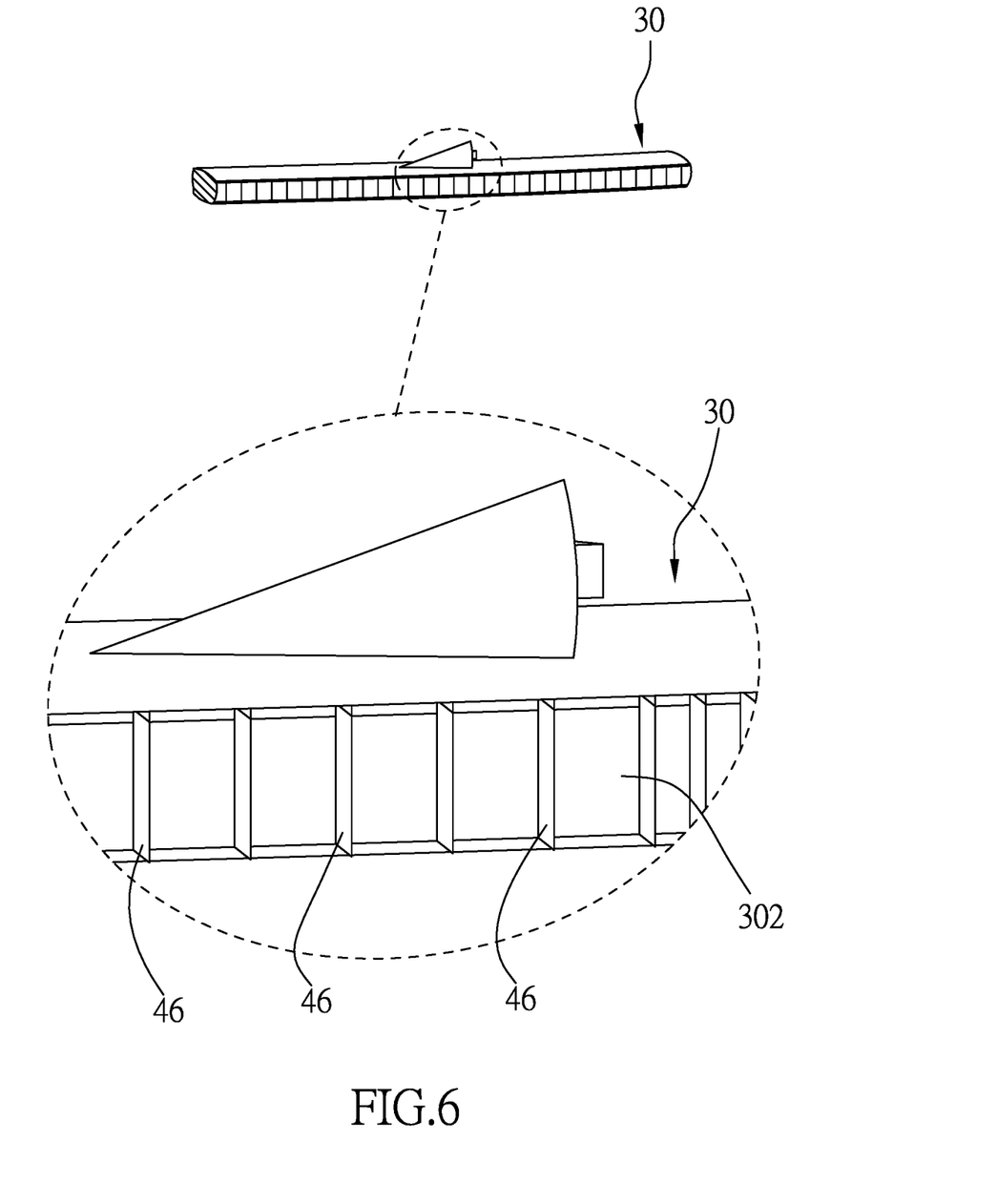
FIG. 6 is a perspective view of the straight light strip of a second preferred embodiment of the present invention.

FIG. 6 shows the straight light strip assembly 30 of the second preferred embodiment of the present invention, which is the same as the first preferred embodiment, except that the strip member 31 of the straight light strip assembly 30 of the second preferred embodiment is provided with a plurality of fins 46 on the exit surface 302. The fins 46 are separated and parallel to each other.

Figure 7:
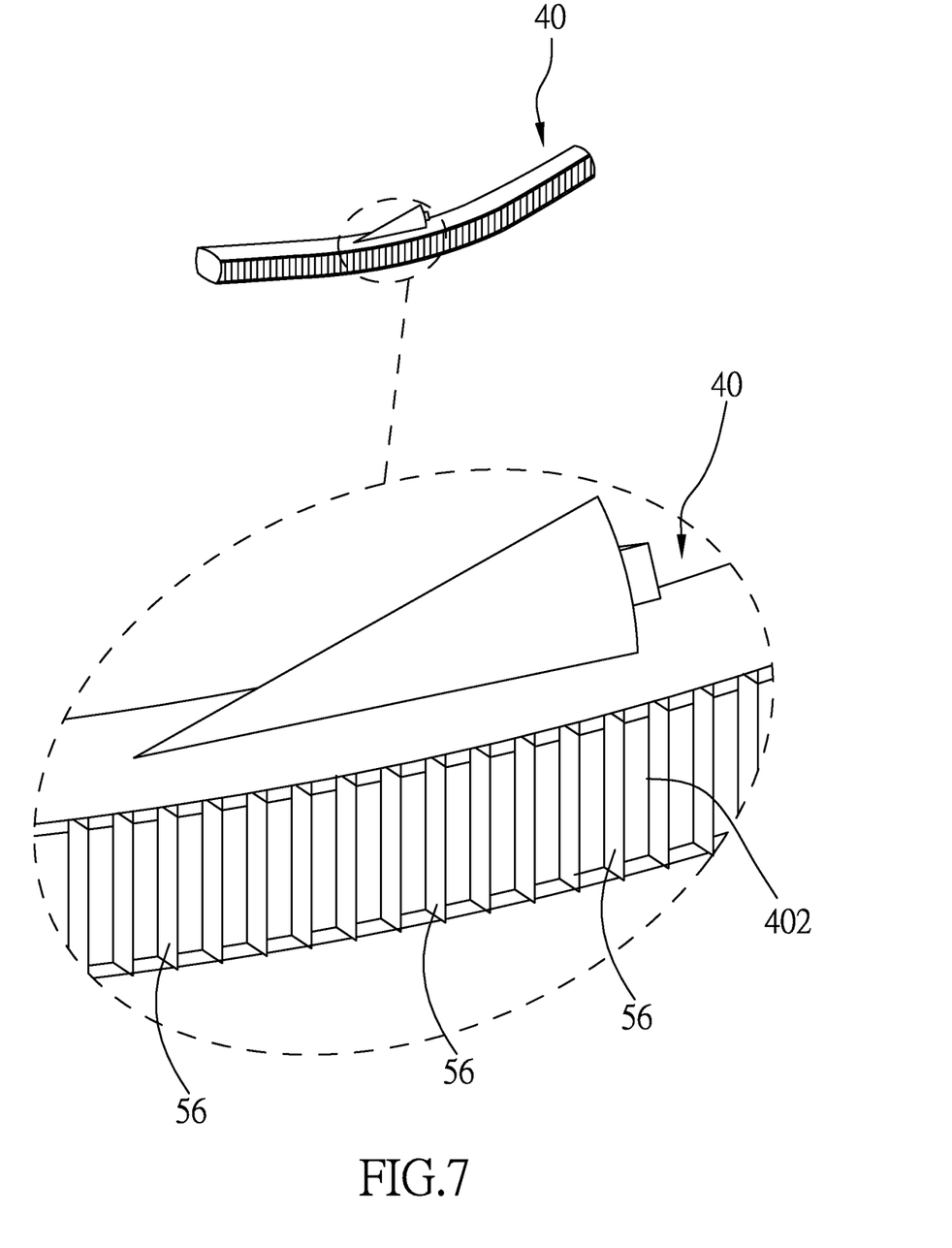
FIG. 7 is a perspective view of the bent light strip of the second preferred embodiment of the present invention.

FIG. 7 shows the bent light strip 40 of the second preferred embodiment of the present invention having a plurality of fins 56 on the bent light strip exit surface 402. The fins 56 are separated and parallel to each other.

The fins 46, 56 on the exit surface 302, 402 help the light leaving the strip member 31, 41, and diffuse the light to form a uniform surface light to reduce halo.

Figure 8:
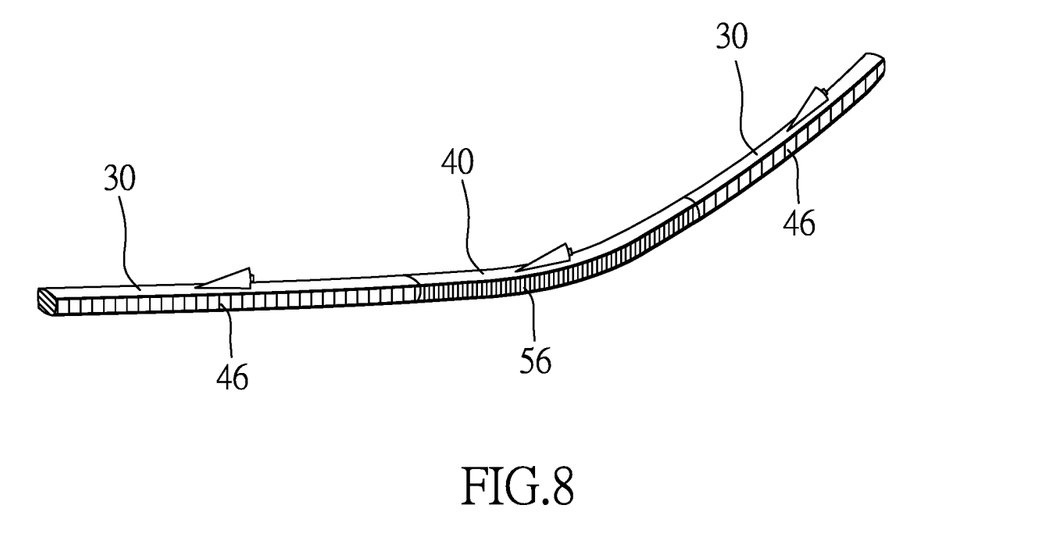
FIG. 8 is a perspective view of second preferred embodiment of the present invention, showing the straight light strip connected to the bent light strip.

FIG. 8 shows that the straight light strip assembly 30 of the second preferred embodiment is connected to the bent light strip 40 of the second preferred embodiment. It clearly shows that a density of the fins 56 of the bent light strip 40 is greater than that of the fins 46 of the straight light strip 30. Since the light attenuates greater in the bent light strip 40 than in the straight light strip assembly 30, the fins 56 with greater density on the bent light strip 40 would help the consistence of luminance of the straight light strip assembly 30 and the bent light strip 40.

The densities of the fins 56 of the bent light strips 40 are various according to the shape of the bent strip members 41. The density of the fins 56 is different at different portions of the bent strip members 41 of the bent light strips 40 according to the curvatures of the portions of the bent strip members 41.

In addition, the light emitting devices 34, 44 generate light of various colors for different purposes. For example, the light emitting devices 34, 44 emit red light to indicate that the electric vehicle is being charged, and emit green light to indicate that the battery is full.

In conclusion, the present invention provides light strips of different shapes for series connection to form a light strip assembly with predetermined shape to match the shape of the specified vehicle. Each light strip is short, so that the cost of manufacture is cheaper than the conventional light strips. Furthermore, the light guiding member is adjacent to the exit surface, so that less light emitting device is needed to generate a uniform light output at the exit surface. Besides, the strip members are connected by the optical adhesive to make the light strip assembly has a uniform light output.

It must be pointed out that the embodiments described above are only some preferred embodiments of the present invention. All equivalent structures which employ the concepts disclosed in this specification and the appended claims should fall within the scope of the present invention.

What is claimed is:

1. A light strip, comprising:
   a strip member having a mounting surface and an exit surface, wherein the exit surface is adjacent to the mounting surface;
   a light guiding member directly protruded on the mounting surface of the strip member, wherein the light guiding member is a semi-cone block having a coned surface with reflector and an entrance surface adjacent to an end of the coned surface, the entrance surface is formed as semi circle shape; and
   a light emitting device associated with the entrance surface of the light guiding member, wherein the light emitting device emits light to the light guiding member, and the light is reflected by the reflector to emit to the strip member, and then the light leaves the strip member via the exit surface.

2. The light strip of claim 1, wherein the strip member is provided with a plurality of fins on the exit surface; the fins are separated and parallel to each other.

3. The light strip of claim 1, wherein the light guiding member includes a light emitting diode (LED) emitting various color light.

4. The light strip of claim 1, wherein the strip member is straight.

5. The light strip of claim 1, wherein the strip member is bent at a predetermined portion.

6. A light strip assembly, comprising:
   a straight light strip including a straight strip member, a light guiding member, and a light emitting device; the straight strip member has a mounting surface and an exit surface, and the exit surface is adjacent to an end of the mounting surface; the light guiding member is directly protruded on the mounting surface of the straight strip member the light guiding member is a semi-cone block having a coned surface with a reflector and an entrance surface adjacent to an end of the coned surface, the entrance surface is formed as semi circle shape and associated with the light emitting device; and
   a bent light strip including a bent strip member, a bent light strip light guiding member, and a bent light strip light emitting device; the bent strip member has a bent light strip mounting surface and bent light strip exit surface, and the bent light strip exit surface is adjacent to the bent light strip mounting surface; the bent light strip light guiding member is directly protruded on the bent light strip mounting surface of the bent strip member,
   wherein the bent light strip light guiding member is a semi-cone block having a coned surface with a bent light strip reflector and an bent light strip entrance surface adjacent to an end of the coned surface, the bent light strip entrance surface is formed as semi circle shape and associated with the bent light strip light emitting device,
   wherein the straight strip member of the straight light strip is serially connected to the bent strip member of the bent light strip with the mounting surface of the straight strip member of the straight light strip connected to the bent light strip mounting surface of the bent strip member of the bent light strip and the exit surface of the straight strip member of the straight light strip connected to the bent light strip exit surface of the bent strip member of the bent light strip, and
   wherein the light emitting device and the bent light emitting device of the straight light strip and the bent light strip emit lights to the light guiding member of straight strip member and the bent light strip light guiding member of bent strip member, and the lights are reflected by the reflector and the bent light strip reflector to emit to the straight strip member and the bent strip member, and then the lights leave the straight strip member and the bent strip member via the exit surfaces, respectively.

7. The light strip assembly of claim 6, wherein the straight strip member and the bent strip member of the straight light strip and the bent light strip are provided with a plurality of fins on the exit surfaces, respectively.

8. The light strip assembly of claim 7, wherein a density of the fins of the bent light strip is greater than that of the fins of the straight light strip.

9. The light strip assembly of claim 6, wherein the light guiding member and the bent light guiding member of the straight light strip and the bent light strip are light emitting diodes (LED) emitting various color lights.

10. The light strip assembly of claim 6, wherein the straight strip member of the straight light strip is serially connected to the bent strip member of the bent light strip through an optical adhesive, and the optical adhesive has a reflectance and/or a refractive index the same as that of the straight strip member of the straight light strip and the bent strip member of the bent light strip.

* * * * *